United States Patent [19]
Vertesy et al.

[11] Patent Number: 5,253,738
[45] Date of Patent: Oct. 19, 1993

[54] SAFETY DISC BRAKE FOR LIFTS

[75] Inventors: Josef Vertesy, Luzern; Toni Bissig, Hergiswil, both of Switzerland

[73] Assignee: Inventio AG, Hergiswil NW, Switzerland

[21] Appl. No.: 727,586

[22] Filed: Jul. 9, 1991

[30] Foreign Application Priority Data

Jul. 12, 1990 [CH] Switzerland ............... 02 327/90

[51] Int. Cl.$^5$ .............................................. B60T 13/04
[52] U.S. Cl. .................................. 188/171; 188/24.19; 188/71.7; 188/72.1; 188/72.3; 188/72.9; 188/196 V; 192/70.25; 192/70.27; 192/90
[58] Field of Search ................... 188/171, 173, 72.9, 188/72.3, 72.1, 71.2, 24.19, 196 V; 192/70.25, 70.27, 70.29, 90

[56] References Cited

U.S. PATENT DOCUMENTS

| | | | |
|---|---|---|---|
| 671,164 | 4/1901 | Fraser | 188/171 |
| 968,055 | 5/1910 | Sundh | 188/171 |
| 1,011,200 | 12/1911 | Ihlder | 188/171 |
| 2,785,710 | 3/1957 | Mowery | |
| 4,066,152 | 1/1978 | Pascal | 192/70.29 X |
| 5,014,828 | 5/1991 | Baldassarre | 188/173 |
| 5,101,939 | 4/1992 | Sheridan | 188/171 |

FOREIGN PATENT DOCUMENTS

| | | |
|---|---|---|
| 2309757 | 9/1974 | Fed. Rep. of Germany . |
| 2343918 | 3/1975 | Fed. Rep. of Germany . |
| 2617882 | 11/1976 | Fed. Rep. of Germany . |
| 2365725 | 4/1978 | France . |
| 2450978 | 10/1980 | France . |
| 20359 | 8/1896 | United Kingdom ........... 188/71.7 |
| 880841 | 10/1961 | United Kingdom . |

*Primary Examiner*—George E. A. Halvosa
*Attorney, Agent, or Firm*—Sandler, Greenblum & Bernstein

[57] ABSTRACT

With this safety disc brake all regulatory safety requirements can be fulfilled with a constructional expenditure approximately like that expended for a simple construction of brake. Fulfillment of the essential safety requirements is attained by providing two partial systems which mechanically operate completely independent of one another and comprise two identical brake levers each provided with a respective separate compression spring braced at a common central impact member fixedly connected with a machine part. As a further feature for fulfilling the safety requirements both of the partial systems are devoid of any mutual mechanical penetrations and overlapping. Opening or release of the brake is accomplished electromagnetically with a pot magnet fixedly secured to one brake lever and an armature plate likewise fixedly secured to the other brake lever. The attachments for connection of the pot magnet and the armature plate to the brake levers are adjustable, so that the armature plate is always attracted for parallel movement by the pot magnet and thus there is not produced impact noise.

6 Claims, 2 Drawing Sheets

SAFETY DISC BRAKE FOR LIFTS

BACKGROUND OF THE INVENTION

Field of the Invention

The present invention relates to a new and improved safety disc brake, especially although not exclusively, for lifts or elevators.

Generally speaking, the safety disc brake of the present development is of the type comprising two brake levers pivotally or rotatably mounted upon support or carrier bolts. These brake levers are provided with brake shoes and brake linings which are urged by pre-biased or pre-loaded brake springs exerting a brake spring force against a brake disc. The brake springs are arranged between the longer arms of the brake levers. A device for exerting an electromagnetic counter force at the side of the longer arms of the brake levers serves to lift the brake shoes and brake linings off the brake disc.

Discussion of the Background and Material Information

The term "safety" in the expression "safety brake" refers to corresponding regulations or requirements imposed upon lift or elevator brakes according to which such must function in compliance with the so-called two circuit principle. Lift or elevator brakes operating in accordance with this principle comprise two partial systems which, upon closing the lift brake, operate mechanically completely independent of one another. Upon failure of the brake closing function of one of the partial systems, the other partial system can normally close and still exert an adequate braking force at the lift or elevator brake. Moreover, the partial system which has failed to operate properly generates an electrical signal by means of a monitoring device which, then, prevents further operation of the faulty installation until the malfunction has been corrected.

Therefore, it is usual to provide a twin-design of the electromagnetic drive for the opening or clearance of the brake at a safety brake system for lifts or elevators, so that there are complied with the mentioned safety regulations or requirements. Further developments of safety brakes contemplate using a single electromagnet, however working with two magnetic armatures, the so-called double-spread magnet. However, such double-spread magnet possesses an inherent risk or shortcoming in as much as the magnetic armatures which engage into the electromagnet can seize or bind, thereby reducing the required security expected of a safety brake.

To preclude the presence of mutually interengaging elements or parts, it has been proposed in the art to employ so-called pot magnets where the magnetic armature is constructed as a flat armature plate.

German Published Patent Application No. 2,617,882, published Nov. 4, 1976, describes an electromagnetic brake control apparatus where there is used the aforementioned type of double-spread magnet for a shoe brake structure and which is afflicted with the previously discussed drawbacks.

In the German Published Patent Application No. 2,343,918, published Mar. 13, 1975, there is disclosed a spring storage brake for lifts or elevators employing two brake levers at each of which there is attached a respective magnetic armature plate. The two brake levers are each actuated by a separate electromagnet of pot-shape design. This arrangement consists of two complete and separate systems, requiring a correspondingly great equipment and cost expenditure as well as a considerable control output for both magnet systems.

SUMMARY OF THE INVENTION

Therefore, with the foregoing in mind, it is a primary object of the present invention to provide an improved safety disc brake which is not afflicted with the aforementioned shortcomings and drawbacks of the prior art.

Another and more specific object of the present invention aims to provide an improved safety disc brake which satisfactorily fulfills all regulatory requirements and possesses less actuation elements than the afore-discussed brake systems of the prior art.

Still a further noteworthy object of the present invention is the provision of an improved safety disc brake which is relatively simple in construction and design, extremely reliable in operation and requires relatively modest maintenance and servicing.

Now in order to implement these and still further objects of the present invention, which will become more readily apparent as the description proceeds, the safety disc brake of the present development is manifested, among other things, by the features that two non-overlapping and mechanically independently movable brake levers of the safety disc brake are provided with an electromagnet which actuates the brake levers against the brake spring force of the brake springs, and such electromagnet comprises a pot magnet which is fixedly connected with one of the brake levers and an armature plate which is fixedly connected with the other brake lever.

As a further aspect of the invention, there are provided means defining a respective three-point attachment having three attachment locations respectively associated with the pot magnet and the armature plate and adjustable at each attachment location in a predetermined working direction of the electromagnet. One of these three-point attachments connects the pot magnet with the one brake lever and the other of these three-point attachments connects the armature plate with the other brake lever.

The invention further contemplates providing a central spring impact means for the pre-biased brake springs for enabling the mechanically independent movement of the two brake levers, and connection means connect the central spring impact means with the machine housing of the safety disc brake.

Moreover, both the pot magnet and the armature plate possess a respective central bore and each such central bore is provided with respective adjustment means for adjustment of the brake springs. Each such adjustment means comprises a respective threaded rotatable spring sleeve or bushing provided for each brake spring for mounting therein the associated brake spring and for selectively loading the associated brake spring.

Additionally, the brake springs advantageously comprise compression springs, and the pot magnet, the armature plate and the compression springs are arranged substantially concentrically with respect to the actuation axis of the safety disc brake. It is also contemplated to use eccentric adjustment means for adjustment of the brake shoes.

One of the more notable advantages of the safety disc brake of the present invention resides in the fact that for opening or disengaging the brake there is used a single magnetic system or electromagnet containing a pot magnet and an armature plate, and thus, there are present fewer moved parts and, in comparison with a double system, there is only required half the energization or excitation power for the electromagnet.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the safety disc brake has been depicted therein, in order to simplify the illustration, as needed for those skilled in the art to readily understand the underlying principles and concepts of the present invention.

Figure 1:
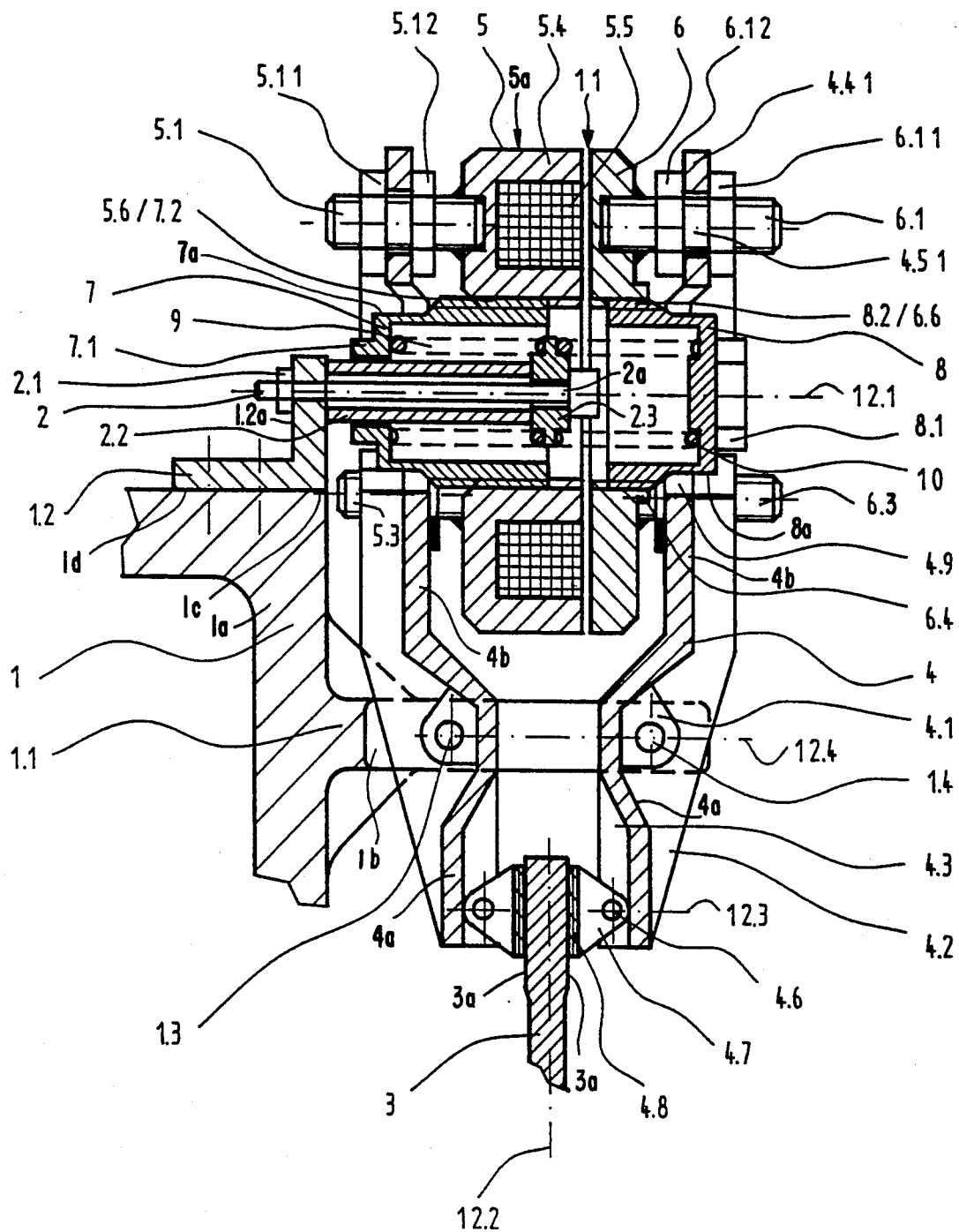
FIG. 1 is a cross-sectional view through an exemplary embodiment of safety disc brake constructed according to the present invention.

Turning now more specifically to the drawings, in FIG. 1 a machine part or component has been generally designated by reference numeral 1. This machine part can comprise a transmission or gear housing, a motor bearing end or shield plate or can be part of a bearing block. A substantially horizontally protruding bifurcated or fork support 1.1 is cast at the vertical wall 1a of the machine part 1. By means of the fork legs, generally indicated by reference character 1b, of the bifurcated or fork support 1.1, two suitable brake lever supporting elements, here, for instance, support or carrier bolts 1.3 and 1.4 are guided at a mutual spacing from one another and substantially parallel to the vertical wall 1a of the machine part 1. There is pivotally or rotatably mounted in the space between the fork legs Ib at each support or carrier bolt 1.3 and 1.4 a respective brake lever or brake lever member 4. A downwardly extending shorter arm or lever arm 4a of each brake lever 4 supports an associated brake shoe 4.7 provided with a brake lining 4.8. These brake shoes 4.7 are hingedly connected by brake shoe bolts 4.6 or equivalent structure at the brake levers 4.

At the region of the brake shoes 4.7 each of the brake levers 4 is provided with a respective inner rib 4.3 and also with a respective outer rib 4.2 extending upwardly over about one-half of the length of the associated brake shoe 4.7. These inner ribs 4.3 and outer ribs 4.2 of the brake levers 4 increase the bending strength of such brake levers 4. The brake shoes 4.7 bear by means of their brake linings 4.8 at the brake surfaces 3a of a brake disc 3 or equivalent structure. At the region of the support or carrier bolts 1.3 and 1.4 each of the brake levers 4 are reinforced by an associated cast bearing eyelet or boss 4.1 or the like.

The pivot or rotation points for the brake levers 4 are located at a so-called system pivot or rotation plane 12.4 and the attachment locations for the brake shoes 4.7 are located at a so-called brake plane 12.3. At a spacing upwardly of the pivot plane 12.4, which, for example, can be more than twice the spacing between the pivot plane 12.4 and the brake plane 12.3, there is located an actuation axis 12.1 at the region of the longer arms 4b of the brake levers 4. Furthermore, all mechanical parts or components, except the electromagnet 5a to be considered shortly, are arranged substantially symmetrically with respect to a system center line 12.2.

Continuing, an angle support or angle-shaped member 1.2 is arranged essentially flush with the right-hand depicted end 1c of the horizontal surface 1d of the machine part or component 1 to which such angle support or angle-shaped member 1.2 is appropriately fixed, such as threadably bolted. The upper region of the vertical leg 1.2a of the angle support 1.2 supports a traction or tension bolt 2 or the like which carries at the right-hand depicted end 2a thereof, at the region of the system center line 12.2, a central spring impact or stop member 2.3, also referred to in the art as a spring stop or abutment center. This central spring impact or stop member 2.3 is retained in the depicted position by a nut member 2.1 or the like located at the left end of the traction or tension bolt 2 and a spacer or distance sleeve 2.2 arranged between the vertical leg 1.2a of the angle support 1.2 and the central spring impact or stop member 2.3. A resilient or spring member, namely a compression spring 9 located to the left of the central spring impact or stop member 2.3 is arranged substantially concentrically of the actuation axis 12.1 and a further resilient or spring member, likewise a compression spring 10 is located to the right of the central spring impact or stop member 2.3 and substantially concentrically of the actuation axis 12.1. A respective spring sleeve or bushing member 7 and 8 pre-biases or loads the therein contained associated compression spring 9 and 10, respectively, in the direction of the central spring impact or stop member 2.3.

The left-hand depicted spring sleeve 7 is provided at its left outer side or end face with an hexagonal projection or shoulder 7.1 and the right-hand depicted spring sleeve 8 is provided at its right outer side or end face with an hexagonal projection or shoulder 8.1. At the substantially cylindrical outer surface 7a of the spring sleeve 7 there is machined an external threading or threads 7.2 which engage with internal threading or threads 5.6 of a pot magnet 5 of the electromagnet 5a. At the substantially cylindrical outer surface 8a of the other spring sleeve 8 there is machined an external threading or threads 8.2 which engage with internal threading or threads 6.6 of an armature plate 6 of this electromagnet 5a.

The pot magnet 5 comprises an annular or ring-shaped magnetic body 5.4 within which there is embedded a likewise annular or ring-shaped magnetic coil 5.5. The armature plate 6 contains a collar-shaped extension or prolongation 6.4 which protrudes to the right of the showing of FIG. 1 over the internal threads 6.6 for enhancing the adjustment or setting of the right-hand depicted compression spring 10. When the safety disc brake is closed, i.e., during the condition in which the brake linings are at a position of engagement with the brake disc, a work or operating air gap 11 is present between the pot magnet 5 and the armature plate 6 which, depending upon the size of the safety disc brake, can amount to 1 to 2 millimeter.

The pot magnet 5 is fixedly threadably connected with the left-hand depicted brake lever 4 by means of three weld-connected threaded bolts 5.1, 5.2 and 5.3 and the associated pairs of nuts, like the nuts 5.11, 5.12 only shown for the threaded bolt 5.1 to simplify the illustration. On the other hand, the armature plate 6 is fixedly threadably connected with the right-hand depicted brake lever 4 by means of three weld-connected threaded bolts 6.1, 6.2 and 6.3 and the associated pairs of nuts 6.11, 6.12 and 6.21, 6.22 and 6.31, 6.32, respectively. In FIG. 1 the weld-connected threaded bolts 5.1 and 6.1 are fully visible and the weld-connected threaded bolts 5.3 and 6.3 are partially visible.

Figure 2:
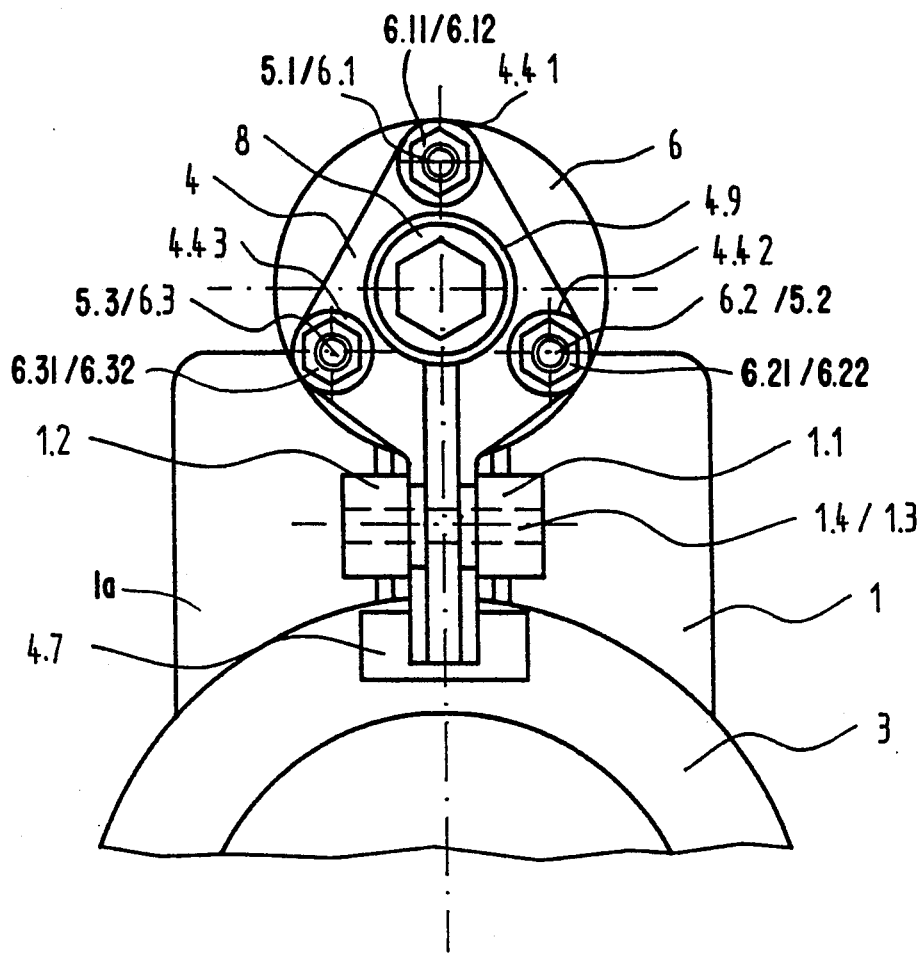
FIG. 2 is a fragmentary side view of the safety disc brake depicted in FIG. 1.

In FIG. 2 the three circumferentially uniformly spaced and outwardly protruding attachment locations defined by attachment or connection eyelets have been generally designated by reference numerals 4.41, 4.42 and 4.43. The weld-connected threaded bolts 6.1, 6.2 and 6.3 piercingly extend through these attachment or connection eyelets 4.41, 4.42 and 4.43, respectively. The substantially triangular plate-shaped upper part of the depicted right-hand brake lever 4 is provided at the central region thereof with a central bore or opening 4.9 through which extends the associated spring sleeve or bushing 8, and thus, is readily accessible for adjustment or setting of the pre-bias of the associated internally located compression spring 10. Since the other brake lever 4 located at the left side of the showing of FIG. 1 is constructed in exactly the same manner it has not been depicted in FIG. 2. In the background of the showing of FIG. 2 there will be seen the vertical front wall 1a of the machine part 1 and in the foreground there is shown an exemplary construction of the bifurcated or fork support 1.1.

Figure 3:
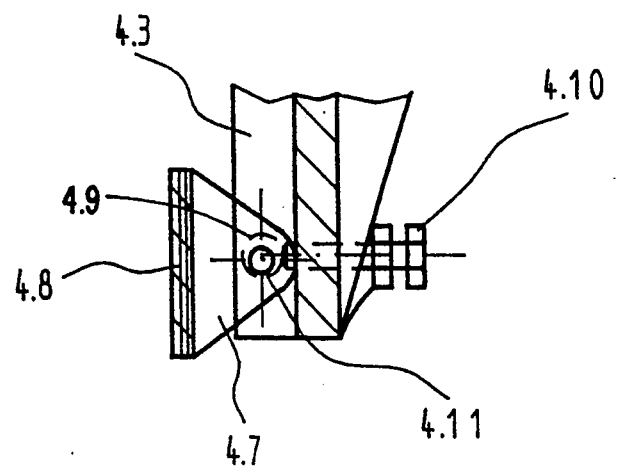
FIG. 3 is a fragmentary view of an adjustment or setting mechanism for one of the brake shoe supports or holders.

Turning attention now to FIG. 3, there is depicted therein a brake shoe support or holder structure which can be adjusted by means of an eccentric 4.9 and an adjustment or setting screw 4.10 or the like. When using this structure there does not exist the need to provide an adjustable attachment of the pot magnet 5 and the armature plate 6 at the brake levers 4.

Having now had the benefit of the foregoing description of the safety disc brake constructed according to the present invention and depicted in FIGS. 1 to 3, there will be considered the operation thereof which is as follows:

Basically, the function of this safety disc brake will be apparent from the showing of FIG. 1. In the depicted state, the magnetic coil 5.5 is not energized, so that the compression springs 9 and 10 exert an appropriate brake spring force upon the inner surfaces of the brake levers 4 along the actuation axis 12.1 through the action of the spring sleeves 7 and 8, magnetic body 5.4 and armature plate 6 and the weld-connected threaded bolts 5.1, 5.2 and 5.3 and 6.1, 6.2 and 6.3 and the associated arresting pairs of nuts 5.11, 5.12 . . . and 6.11, 6.12 and 6.21, 6.22 and 6.31, 6.32, respectively. As a function of the relationship or ratio between the length of the lever or lever arm between the actuation axis 12.1 and the system pivot plane 12.4 and the length of the lever or lever arm between the system pivot plane 12.4 and the brake plane 12.3 a corresponding braking force is exerted upon the brake disc 3 by means of the brake shoes 4.7 and brake linings 4.8. The braking force is adjustable within predetermined limits by appropriately inwardly or outwardly rotating the spring sleeves or bushings 7 and 8 in the internal threading 5.6 and 6.6 of the magnetic body 5.4 and armature plate 6, respectively. The hexagonal projections or shoulders 7.1 and 8.1 allow for such adjustment by a standard fork spanner or other appropriate tool.

The opening or clearing travel of the safety disc brake in the predetermined working or operating direction of the electromagnet 5a, i.e., to move the brake linings to a position of disengagement with the brake disc, is governed by the set working or operating air gap 11 which, for instance, can amount to 1 to 1.5 millimeters. When using a pot magnet 5 consideration is to be given to the extremely steep force-displacement characteristic, wherein its effects reside in the very rapidly decreasing force upon enlargement of the air gap and in the extremely great adhesion or gripping force which exists in the closed condition. The latter is countered in that a not particularly illustrated adhesively connected plate produces a residual air gap in the energized state of the safety disc brake and the magnetic coil 5.5, following opening or clearance of the safety disc brake, is switched-over to holding excitation.

Upon opening of the safety disc brake there additionally exists the problem of synchronous movement of both of the brake levers 4 since there is not present any positive or forced mechanical actuation. It is important, following opening of the safety disc brake, to lift both of the brake linings 4.8 off of the brake disc 3 and that these brake linings 4.8 do not in any event again contact the brake disc 3. This desired result is realized by carrying out appropriate procedures and manipulations during setting of the safety disc brake. Firstly, while the compression springs 9 and 10 are still load-relieved and during complete release of the pairs of nuts 5.11, 5.12 . . . and 6.11, 6.12 and 6.21, 6.22 and 6.31, 6.32, the magnetic coil 5.5 is weakly energized so that the pot magnet 5 has completely attracted the armature plate 6 and with the working or operating air gap 11 amounting to null. In this condition of the safety disc brake there is adjusted or set at each upper region of the brake levers 4 by means of the associated pairs of nuts, a desired brake opening or clearance travel at the brake disc 3, which at that location can, for example, amount to 0.25 millimeter. Then the computed pre-biased length of the compression springs 9 and 10 is provisionally set by rotating the associated spring sleeves 7 and 8 in the appropriate direction. In order to reduce the friction upon loading the compression springs 9 and 10, not particularly illustrated track bearings are beneficially provided at both sides of the central spring impact or stop member 2.3. Thereafter, due to further adjustment of the spring sleeves 7 and 8 there is set a force equilibrium of the compression springs 9 an 10, and upon attaining such force equilibrium there is desirably achieved a movement-synchronous operation of both brake levers 4. This is also possible for the reason that a mechanical basis is achieved at the center of the brake system by means of the central spring impact or stop member 2.3.

A further problem which exists is that of noise development upon opening or clearance of the safety disc brake. This problem is solved in as much as due to the fixed retention and guiding of the pot magnet 5 and armature plate 6 there is accomplished a completely parallel closing of the working or operating air gap 11, so that at the end of the closing movement an air cushion exerts an impact dampening action. Additionally, the previously mentioned intermediate layer of the air gap in the form of an adhesively connected plate can consist of a suitable non-metallic and sound-dampening material.

The conformity of the safety disc brake to safety regulations or requirements is realized in that each half of the brake system operates mechanically completely independently of the other half of the brake system. For instance, if a part or component of one-half of the brake system should bind or rupture, the other half of the brake system nonetheless closes and exerts one-half of the braking force. The malfunctioning half of the brake system then can generate an error or warning signal by means of a conventional and therefore not here illustrated monitoring device. A further feature of a safety brake resides in the fact that there are not present any mutual mechanical penetrations or openings or overlappings, which if otherwise present could result in the entry of foreign bodies or contaminants which could lead to blocking of the brake. Moreover, the three-point attachment of the pot magnet 5 and the armature plate 6 at the brake levers 4 affords a more precise adjustment or setting of these two components relative to one another. For this purpose the upper part of brake lever 4 is configured as a flat triangle and the outwardly protruding attachment eyelets 4.41, 4.42 and 4.43 produce an additional reinforcement. Manual opening or clearance of the safety disc brake can be achieved by a non-illustrated separate mountable lever clamp or the like.

Finally, it is worthy to again mention that the herein illustrated and described safety disc brake not only can be employed in conjunction with lifts or elevators, but also in connection with other types of lifting equipment, particularly those which must comply with strict safety requirements. The lever ratios can be adapted to the momentarily encountered fields of use by accomplishing appropriate constructional modifications.

While there are shown and described present preferred embodiments of the invention, it is distinctly to be understood the invention is not limited thereto, but may be otherwise variously embodied and practiced within the scope of the following claims.

What is claimed is:

1. A safety disc brake, especially for lifts, comprising:
carrier bolts;
two brake levers pivotally mounted upon the carrier bolts;
said brake levers being provided with brake shoes and brake linings;
each of said brake levers having a longer arm and a shorter arm;
a brake disc;
pre-biased brake springs for urging the brake shoes and brake linings of the brake levers against the brake disc;
said pre-biased brake springs being arranged between the longer arms of the brake levers and exerting a brake spring force;
said brake levers being non-overlapping and mechanically independently movable;
means for exerting an electromagnetic counter force effective at the region of the longer arms of the brake levers to lift the brake shoes and brake linings of the brake levers off the brake disc;
said means for exerting an electromagnetic counter force comprising an electromagnet which actuates the brake levers against the brake spring force of the brake springs;
said electromagnet comprises a pot magnet which is fixedly connected with one of the brake levers of the two brake levers and an armature plate which is fixedly connected with the other brake lever of the two brake levers;
the electromagnet has a predetermined working direction;
means defining a respective three-point attachment having three attachment locations respectively associated with the pot magnet and the armature plate and adjustable at each attachment location in said predetermined working direction;
one of said three-point attachments connected the pot magnet with the one brake lever; and
the other of said three-point attachments connecting the armature plate with the other brake lever.

2. The safety disc brake as defined in claim 1, wherein:
said pot magnet is provided with a substantially central bore;
said armature plate is provided with a substantially central bore; and
each said central bore of said pot magnet and said armature plate being provided with adjustment means for adjustment of the brake springs.

3. The safety disc brake as defined in claim 2, wherein:
said adjustment means comprise a respective threaded rotatable spring sleeve provided for each brake spring for mounting therein the associated brake spring and for selectively loading the associated brake spring.

4. The safety disc brake as defined in claim 1, wherein:
said brake springs comprise compression springs;
said safety disc brake having an actuation axis; and
said pot magnet, said armature plate and said compression springs being arranged substantially concentrically with respect to said actuation axis.

5. The safety disc brake as defined in claim 1, further including:
supporting means for the brake shoes; and
said supporting means comprising eccentric adjustment means for adjustment of the brake shoes.

6. A safety disc brake, especially for lifts, comprising:
means for supporting brake levers;
two brake levers pivotally mounted upon the supporting means;
said brake levers being provided with brake shoes and brake linings;
a brake disc;
pre-biased brake springs exerting spring force for urging the brake shoes and brake linings of the brake levers against the brake disc;
said brake levers being mechanically independently movable;
means for exerting an electromagnetic counter force to lift the brake shoes and brake linings of the brake levers off the brake disc;
said means for exerting an electromagnetic counter force comprising electromagnet means for actuating the brake levers against the spring force of the brake springs;
said electromagnet means comprise a pot magnet which is fixedly connected with one of the brake levers of the two brake levers and an armature plate which is fixedly connected with the other brake lever of the two brake levers;
a machine housing;
a central spring impact means provided for the pre-biased brake springs for enabling mechanically independent movement of the two brake levers;
connection means for fixedly connecting the central spring impact means with the machine housing;
the electromagnet has a predetermined working direction;

means defining a respective three-point attachment having three attachment locations respectively associated with the pot magnet and the armature plate and adjustable at each attachment location in said predetermined working direction;

one of said three-point attachments connecting the pot magnet with the one brake lever; and the other of said three-point attachments connecting the armature plate with the other brake lever.

* * * * *